United States Patent
Preisig et al.

(10) Patent No.: US 6,882,996 B2
(45) Date of Patent: Apr. 19, 2005

(54) SYSTEM, METHOD, AND COMPUTER PROGRAM PRODUCT FOR REFORMATTING NON-XML DATA FOR USE WITH INTERNET BASED SYSTEMS

(75) Inventors: Reto Preisig, San Jose, CA (US); Arthur Gary Ryman, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 475 days.

(21) Appl. No.: 09/871,475

(22) Filed: May 31, 2001

(65) Prior Publication Data

US 2002/0184219 A1 Dec. 5, 2002

(51) Int. Cl.[7] .............................................. G06F 17/30
(52) U.S. Cl. .............................. 707/4; 707/10; 709/203
(58) Field of Search ...................... 707/1–5, 10, 104.1, 707/100; 709/203, 217, 219

(56) References Cited

U.S. PATENT DOCUMENTS

| 5,953,524 | A | 9/1999 | Meng et al. ............... 395/701 |
| 6,012,067 | A | 1/2000 | Sarkar ....................... 707/103 |
| 6,094,655 | A | 7/2000 | Rogers et al. ............... 707/10 |
| 6,151,601 | A | 11/2000 | Papierniak et al. .......... 707/10 |
| 6,167,448 | A | 12/2000 | Hemphill et al. ........... 709/224 |
| 6,418,448 | B1 * | 7/2002 | Sarkar ..................... 707/104.1 |
| 6,625,647 | B1 * | 9/2003 | Barrick et al. ............. 709/224 |
| 6,801,914 | B1 * | 10/2004 | Barga et al. ................ 707/10 |
| 2001/0037345 | A1 * | 11/2001 | Kiernan et al. |
| 2003/0037173 | A1 * | 2/2003 | Pace et al. |
| 2003/0101238 | A1 * | 5/2003 | Davison |

FOREIGN PATENT DOCUMENTS

| WO | WO 98/54915 | 12/1998 | ............ H04Q/3/00 |

OTHER PUBLICATIONS

Publication: "Simple Object Access Protocol (SOAP) 1.1". Box et al. W3C Note. DevelopMentor, IBM, Lotus Development Corp., Microsoft, UserLand Software. pp. 1–12. May 8, 2000.

* cited by examiner

*Primary Examiner*—Greta Robinson
*Assistant Examiner*—Debbie M. Le
(74) *Attorney, Agent, or Firm*—John L. Rogitz

(57) ABSTRACT

A client submits a service request, e.g., a SOAP request, an HTTP GET request or an HTTP POST request. If necessary, parameters within a Structured Query Language (SQL) string are replaced with corresponding values from the client service request. The SQL statement is executed at a database which, in turn, generates a response to the SQL statement. If necessary, the response is converted to XML. The response is then sent to the client.

29 Claims, 9 Drawing Sheets

```
<?xml version="1.0"?>
<DADX xmlns="urn:ibm.com:dadx"
  xmlns:xsd="http://www.w3.org/2000/10/XMLSchema">
<documentation>mycompany part orders service.</documentation>
```

70— `<operation name="findAll">`
   `<documentation>Returns all the orders.</documentation>`
   `<retrieveXML>`
76 — `<DAD_ref>getstart_xcollection.dad</DAD_ref>`

78 {
   `<SQL_override>`
   select o.order_key, customer_name, customer_email,
     p.part_key, color, quantity, price, tax, ship_id, date, mode
   from order_tab o, part_tab p,
     table(select substr(char(timestamp(generate_unique())).16)as ship_id,
     date, mode, part_key from ship_tab) s
84 — where p.order_key = o.order_key and s.part_key = p.part_key
   order by order_key, part_key, ship_id
   `</SQL_override>`

`</retrieveXML>`
 `</operation>`

72— `<operation name="findByColor">`
   `<documentation>Returns all the orders that have the specified color.</documentation>`
   `<retrieveXML>`
76 — `<DAD_ref>getstart_xcollection.dad</DAD_ref>`

80 {
   `<SQL_override>`
   select o.order_key, customer_name, customer_email,
     p.part_key, color, quantity, price, tax, ship_id, date, mode
   from order_tab o, part_tab p,
     table(select substr(char(timestamp(generate_unique())).16) as ship_id,
     date, mode, part_key from ship_tab) s
86 — where p.order_key = o.order_key and s.part_key = p.part_key
   and color = color
   order by order_key, part_key, ship_id
   `</SQL_override>`

`<parameters>`
     `<parameter name="color" type="xsd:string"/>`
   `</parameters>`
   `</retrieveXML>`
 `</operation>`

Figure 3A

74 — <operation name="findByMinPrice">
    <documentation>Returns all the orders that have a price greater than or equal to the specified minimum price.</documentation>
    <retrieveXML>
76 — <DAD_ref>getstart_xcollection.dad</DAD_ref>
        <SQL_override>
        select o.order_key, customer_name, customer_email,
            p.part_key, color, quantity, price, tax, ship_id, date, mode
        from order_tab o.part_tab p,
82      table(select substr(char(timestamp(generate_unique())).16) as ship_id,
            date, mode, part_key from ship_tab) s
88 — where p.order_key = o.order_key and s.part_key = p.part_key
        and p.price >= :minprice
        order by order_key, part_key, ship_id
        </SQL_override>
        <parameters>
        </parameters>
    </retrieveXML>
    </operation>
</DADX>

Figure 3B

```
<?xml version="1.0"?>
<schema xmlns="http://www.w3.org/2000/10/XMLSchema"
targetNamespace="urn:ibm.com:dxx:dadx"
xmlns:dadx="urn:ibm.com:dxx:dadx">

<annotation>
   <documentation>A DADX document defines a Web Service implemented by operations that use
      the DB2 XML Extender.
   </documentation>
</annotation>

<element name="DADX">

<complexType>
      <sequence>
         <element ref="dadx:documentation" minOccurs="0"/>
         <element ref="dadx:implements" minOccurs="0"/>
         <element ref="dadx:operation" maxOccurs="unbounded"/>
      </sequence>
   </complexType>

<unique name="operationNames">
      <selector xpath="dadx:operation"/>
      <field xpath="@name"/>
   </unique>

</element>

<element name="documentation">
   <complexType mixed="true">
      <choice minOccurs="0" maxOccurs="unbounded">
         <any minOccurs="0" maxOccurs="unbounded"/>
      </choice>
      <any Attribute?>
   </complexType>
</element>
```

Figure 4A

```xml
<element name="implements">
  <complexType>
    <attribute name="namespace" type="uriReference" use="required"/>
    <attribute name="location" type="uriReference" use="required"/>
  </complexType>
</element>

<element name="operation">
  <complexType>
    <sequence>
      <element ref="dadx:documentation" minOccurs="0"/>
      <choice>
        <element ref="dadx:retrieveXML"/>
        <element ref="dadx:storeXML"/>
        <element ref="dadx:query"/>            104
        <element ref="dadx:update"/>           106
        <element ref="dadx:call"/>             108
      </choice>
    </sequence>
    <attribute name="name" type="NCName" use="required"/>
  </complexType>
</element>

<element names="retrieveXML">
          <complex Type>
            <sequence>
              <choice>
                <element ref="dadx: DAD_ref"/>
                <element ref="dadx:collection_name"/>
              </choice>
              <choice>
                <element name="no override">
                  <complexType/>
                </element>
```

Figure 4B

```
112 ──<element name="SQL_override" type="string"/>
        <element name="XML_override" type="string"/>
      </choice>
110 ──<element ref="dadx:parameter" minOccurs="0" maxOccurs="unbounded"/>
      </sequence>
    </complexType>

<unique name="parameterNames">
      <selector xpath="dadx:parameter"/>
      <field xpath="@name"/>
    </unique>

</element>

<element name="storeXML">
    <complexType>
      <choice>
        <element ref="dadx:DAD_ref"/>
        <element ref="dadx:collection_name"/>
      </choice>
    </complexType>
  </element>

<element name="query">

<complexType>
      <sequence>
114 ──<element name="SQL_query" type="string"/>
        <element ref="dadx:XML_result" minOccurs="0" maxOccurs="unbounded"/>
110 ──<element ref="dadx:parameter" minOccurs="0" maxOccurs="unbounded"/>
      </sequence>
    </complex Type>

<unique name="XML_resultNames">
      <selector xpath="dadx:XML_result"/>
```

Figure 4C

```
        <field xpath="@name"/>
      </unique>

<unique name="parameterNames">
        <selector xpath="dadx:parameter"/>
        <field xpath="@name"/>
      </unique>

</element>

<element name="update">

<complexType>
        <sequence>
116 ——   <element name="SQL_update" type="string"/>
110 ——   <element ref="dadx:parameter" minOccurs="0" maxOccurs="unbounded"/>
        </sequence>
      </complexType>

<unique name="parameterNames">
        <selector xpath="dadx:parameter"/>
        <field xpath="@name"/>
      </unique>

</element>

<element name="call">

<complexType>
        <sequence>
118 ——   <element name="SQL_call" type="string"/>
110 ——   <element ref="dadx:parameter" minOccurs="0" maxOccurs="unbounded"/>
        </sequence>
      </complexType>
```

Figure 4D

```xml
<unique name="parameterNames">

<selector xpath="dadx:parameter"/>
 <field xpath="@name"/>
</unique>

</element>

<element name="no_override">
 <complexType/>
</element>

<element name="DAD_ref" type="string"/>

<element name="parameter">
 <complexType>
  <attribute name="name" type="NCName" use="required"/>
  <attribute name="element" type="QName"/>
  <attribute name="type" type="QName"/>
  <attribute name="kind" type="dadx:parameterKindType" default="in"/>
 </complexType>
</element>

<simpleType name="parameterKindType">
 <restriction base="string">
  <enumeration value="in"/>
  <enumeration value="out"/>
  <enumeration value="in/out"/>
 </restriction>
</simpleType>

<element name="XML_result">
 <complexType>
  <attribute name="name" type="NCName" use="required"/>
  <attribute name="element" type="QName" use="required"/>
 </complexType>
</element>

</schema>
```

Figure 4E

SYSTEM, METHOD, AND COMPUTER PROGRAM PRODUCT FOR REFORMATTING NON-XML DATA FOR USE WITH INTERNET BASED SYSTEMS

TECHNICAL FIELD

The present invention relates generally to computer database software and more specifically to a parameterized database system query.

BACKGROUND OF THE INVENTION

Many companies store data on database systems such as the present assignee's DB2 relational database system. DB2 is a registered trademark of International Business Machines Corporation in the United States, other countries, or both. The DB2 system is a relational database system that facilitates fast and efficient data extraction using queries written in a language known as Structured Query Language (SQL). As a simple example, using an SQL statement a relational database system can be used to search for all employees in the database that have salaries in excess of $50,000 and that are in the engineering department of the company. The portions of the statement that specify the salary and department search criteria re referred to as "parameterized" portions of the statement.

It is increasingly the case that companies wish to permit certain customers (or indeed the public at large) to access a company's database. This is possible owing to the Internet, because a database can be made accessible via the Internet. As an example of when a company might want to allow access, a bank might want to allow its customers to access stock quotes that are frequently updated and available in a database. This can be thought of as a database query. As another example, a library might wish to allow book borrowers to enter the library database and change their address when they move, without requiring interfacing with library personnel. This can be thought of as an update.

Prior systems and methods for allowing selected outside entry into a Web-accessible internal database suffer from several drawbacks. Some of these previous systems, such as the Common Object Request Broker Architecture (CORBA), were initially designed for internal data transfer, and accordingly did not use Hypertext Transfer Protocol (HTTP). One consequence of this is that since non-HTTP data cannot pass through computer firewalls, systems like CORBA are ineffective for a great many customers whose computers reside behind corporate or Internet Service Provider (ISP) firewalls. Other systems and methods require specific tailoring for each database system sought to be accessed, which requires the access system to be inflexibly bound to a particular database management system (DBMS) language.

SUMMARY OF THE INVENTION

Having recognized the above drawbacks, the preferred embodiment of the present invention provides the solutions noted below to one or more of them.

A method for permitting a client to access a database system on a server via an Internet connection includes providing middleware communicating with the client and server. The middleware includes a file that has a parameterized database system query language statement. The file is accessed in response to a client request for data. Using the parameterized statement, data is returned that satisfies the request to the client.

Preferably, the database system query language is SQL. Moreover, the data that satisfies the request is sent via HTTP in Extensible Markup Language (XML). In a preferred embodiment, the parameterized statement facilitates a query for data. On the other hand, the parameterized statement facilitates an update to the database system or facilitates an SQL stored procedure call.

In a preferred embodiment, the client request is a Simple Object Access Protocol (SOAP) request, an HTTP GET request, or an HTTP POST request. Preferably, the middleware includes a router that receives the client request. The router includes a servlet that replaces some parameters in the parameterized statement with corresponding values from the client request to establish a fully qualified SQL statement. The servlet sends the SQL statement to the database system for execution thereof.

Preferably, the database system generates a response to the SQL statement, and if necessary, the servlet converts the response to XML. In a preferred embodiment, the servlet generates documentation and a test page in Hypertext Markup Language (HTML) based on the client request. The servlet also generates a service description (Web Services Description Language (WSDL) file) based on the parameterized SQL statement. Moreover, if necessary, the servlet incorporates a document access definition (DAD) file into the client request. The servlet can also generate Extensible Markup Language Schema data (XSD) based on the client request.

In another aspect of the present invention, a computer system includes a client and middleware that is accessible to the client. The system also includes a file that is accessible to the middleware. In this aspect, the file contains a parameterized statement. The computer system also includes a database system that is accessible to the middleware.

In yet another aspect of the present invention, a method for permitting a client to access a database system on a server via a wide area network includes providing a file between the client and database system. The file has at least one parameterized SQL statement. In this aspect, the parameters in the parameterized statement are replaced with corresponding values from the client request to establish a fully qualified SQL statement. The SQL statement is sent to the database system where it is executed. A response to the SQL statement is generated at the database system, and then sent to the client. If necessary, the response is converted to XML before it is sent to the client.

In still another aspect of the present invention, a computer program device includes a computer readable means having logic means for facilitating data communication between a client and a database at a server. The computer readable means includes logic means for receiving a client request for data. Moreover, the computer readable means includes logic means for accessing a file having a parameterized SQL statement based on the client request. In this aspect, the computer readable means also includes logic means for returning a response to the client in XML over HTTP based on the parameterized SQL statement.

The present invention will now be described, by way of example, with reference to the accompanying drawings, in which:

BRIEF DESCRIPTION OF THE DRAWINGS

FIG. 3 is an example of a specific DADX file; and

FIG. 4 is the general schema for a DADX file.

DESCRIPTION OF AN EMBODIMENT OF THE INVENTION

Figure 1:
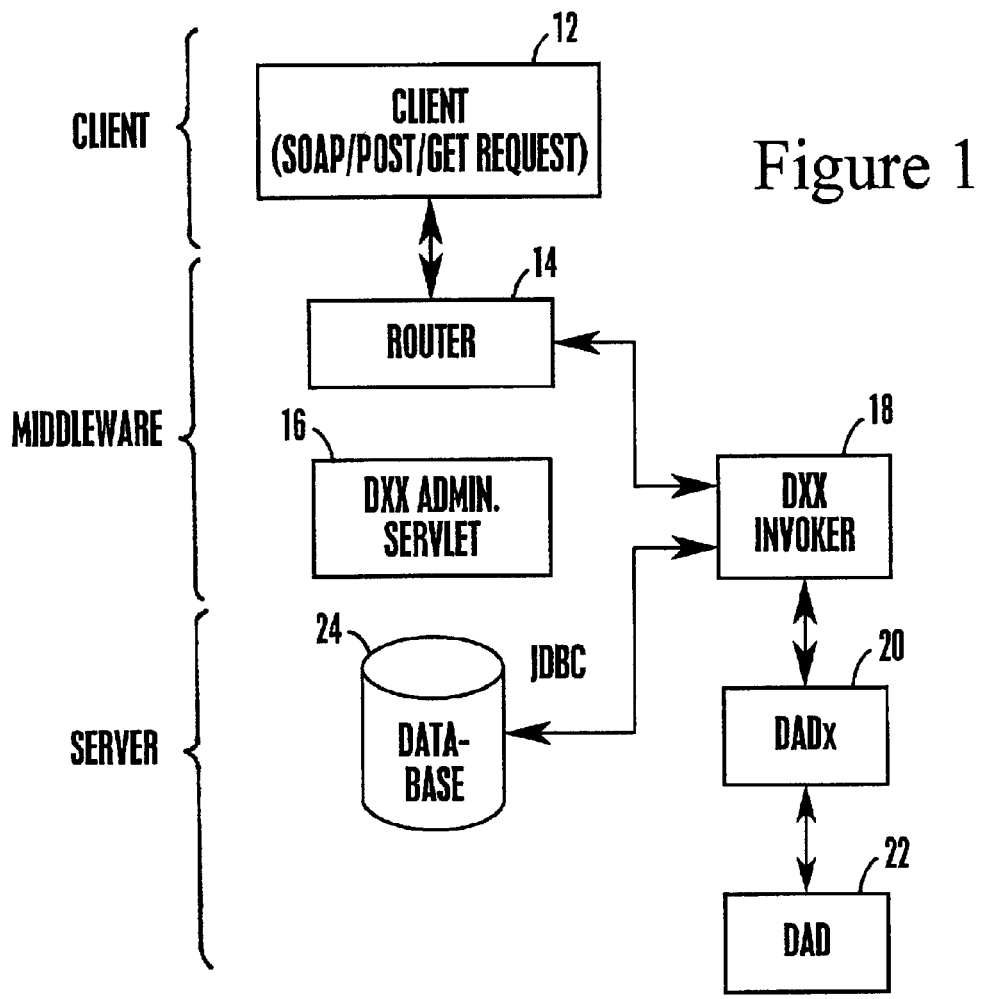
FIG. 1 is a block diagram of a system architecture.

Referring initially to FIG. 1, a system is shown and generally designated 10. As shown in FIG. 1, the system includes at least one client computer 12 connected to a router 14. Preferably, the connection between the client computer 12 and the router 14 is established via the Internet, but other connections can be used. It can be appreciated that the client computer 12 connects to the Internet via telephone modem, cable modem, local-area network (LAN), wide-area network (WAN), T1 or any other means well known in the art. FIG. 1 shows that the router 14 includes a DB2 XML extender administrative servlet (DXX admin servlet) 16. The DXX admin servlet 16 configures at least one DXX invoker 18, which in turn can access at least one document access definition extension (DADX) file 20. The DADX file 20, in turn, can access one or more DAD files 22.

DXX is a collection of stored procedures, user defined types (UDTs), and user defined functions (UDFs) that are typically used in programs written in SQL, Java, C++, and other languages. The DXX invoker 18 handles universal resource locators (URLs) having the extensions ".dadx" that reference web services and ".dtd" that reference document type definition (DTD) documents. Specifically, the DXX invoker 18 provides runtime support for invoking DADX documents as web services written, e.g., in Apache Simple Object Access Protocol (SOAP). As shown, the servlet 16 of the router 14 connects to a database 24 at invocation times. Preferably, this connection is established by a Java database connection (JDBC).

In a preferred embodiment, the DXX Invoker 18, a Java component, interfaces with Apache SOAP 2.1 runtime using a pluggable provider support. A web application developer creates an instance of the DXX Invoker 18 for each database 24 that is to be accessed. Each instance of the DXX Invoker 18 is associated with a database connection and a set of DADX files. The DXX Admin servlet 16 is provided to simplify the task of creating instances of the DXX Invoker 18. Specifically, the DXX Admin servlet 16 provides a web user interface for configuring instances of the DXX Invoker 18. Someone, e.g., a database administrator, sets up the databases and enables them for use by DXX. The service provider creates DAD and DADX documents and deploys them to the web application. Each DADX document is associated with a URL that identifies a specific web service.

The logic of the present invention may be contained on a data storage device with a computer readable medium, such as a computer diskette. Or, the instructions may be stored on a magnetic tape, conventional hard disk drive, electronic read-only memory, optical storage device, or other appropriate data storage device or transmitting device thereby making a computer program product, i.e., an article of manufacture according to the invention. In an illustrative embodiment of the invention, the computer-executable instructions may be lines of Java code.

The flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program elements in a form that instructs a digital processing apparatus (that is, a computer) to perform a sequence of function steps corresponding to those shown.

It is to be understood that throughout the remainder of this document, any reference to "client" includes the client computer 12. Any reference to "middleware" includes the portion of the system 10 including the router 14, the DXX admin servlet 16, the DXX invoker 18, the DADX document 20, and the DAD document 22. Also, any reference to "server" includes the database 24.

Figure 2:
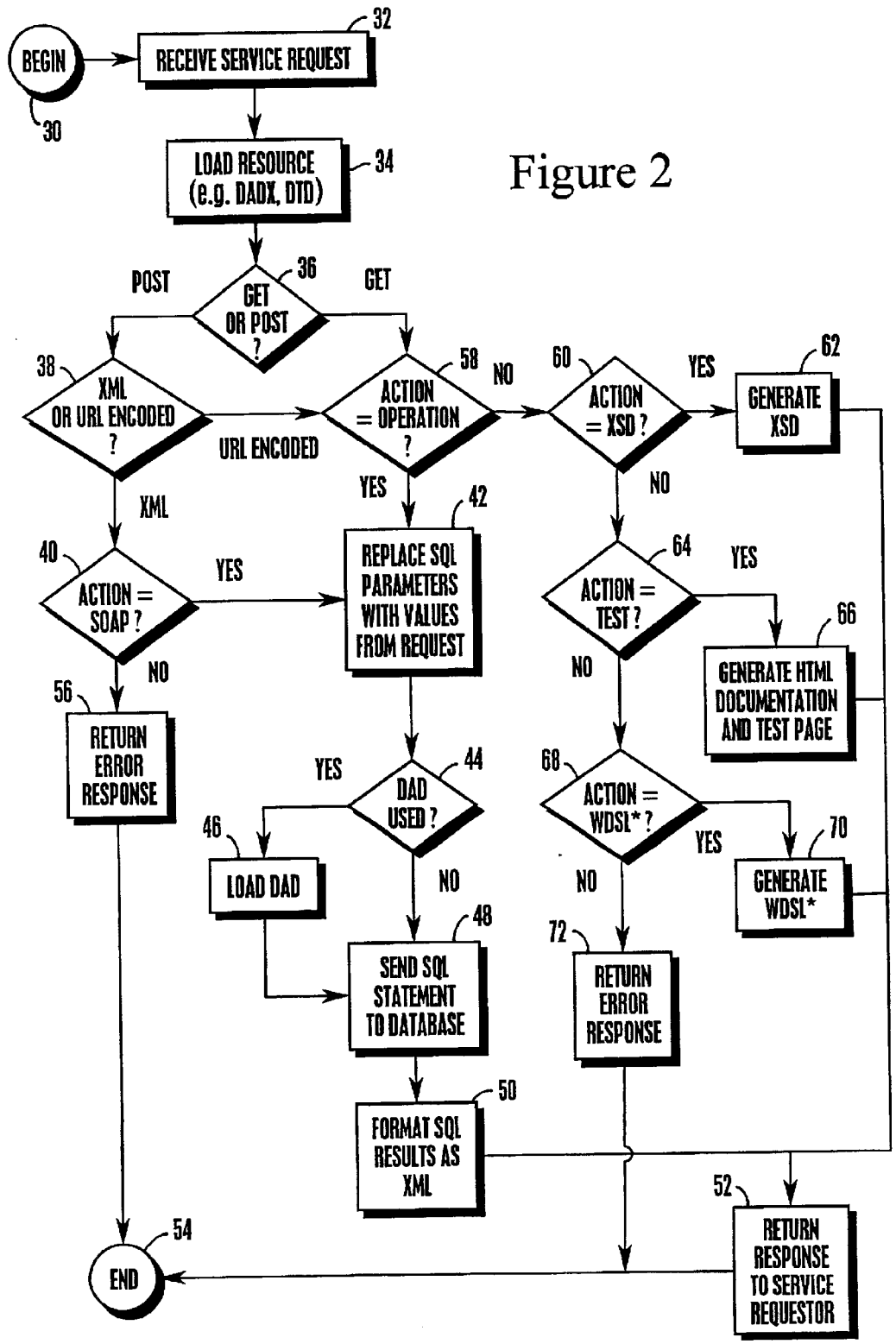
FIG. 2 is a flow chart of the processing logic of the preferred embodiment of the present invention.

Referring to FIG. 2, the processor operational logic of the present invention is shown and begins at state 30. At block 32, an HTTP service request is received. For example, the service request can be a client price request for a particular product—the price of the product being contained in a database of prices at the server. The request specifies the method (HTTP GET or HTTP POST). If the method is POST, the request also specifies the content type (XML or URL encoded). The request URL specifies the target resource file (DADX or DTD) and the action (an operation defined in the DADX file or a command which is one of: SOAP, TEST, XSD, WSDL, WSDLservice, or WSDLbinding.) For example, the URL "http://services.myco.com/sales/PartOrders.dadx/TEST" specifies the DADX resource file named PartOrders.dadx and the action TEST. If the action is an operation, the request also contains the input parameters.

Continuing the description of the logic, at block 34, the resource (DADX or DTD) specified by the request is loaded. Next, at decision diamond 36, it is determined whether the method is POST or GET. If the method is POST, the logic moves to decision diamond 38 where it is determined whether the POST request is XML or URL encoded. If the POST request is XML, the logic moves to decision diamond 40 where it is determined whether the action is SOAP. If the action is SOAP, the logic continues to block 42 where the SQL parameters are replaced with values from the request. From block 42, the logic proceeds to decision diamond 44 where it is determined whether DAD is used. DAD might be used if the request requires storing or retrieving XML. If so, the DAD is loaded at block 46. Thereafter, at block 48, the SQL statement is sent to the database. Proceeding to block 50, the SQL result is formatted as XML. It is to be understood that the SQL result can be formatted as XML at the database or at the router. At block 52, an XML response is returned to the service requester. The logic then ends at state 54. At decision diamond 44, if DAD is not used, the logic moves to block 48 and continues as described above.

Returning to decision diamond 40, if the action is not SOAP, the logic moves to block 56 where an error response is returned to the service requester. The logic then ends at state 54. If, at decision diamond 38, the POST request is URL encoded, the logic proceeds to decision diamond 58 where it is determined whether the action is an operation. Similarly, at decision diamond 36, if the method is GET, the logic also proceeds to decision diamond 58. At decision diamond 58, if the action is an operation, the logic continues to block 42 and continues as described above. On the other hand, if the action is not an operation, the logic proceeds to decision diamond 60 where it is determined whether the action is XSD. If so, an XSD response is generated, at block 62, from the resource specified by the request. For example, if the resource is a DTD, it is converted to XSD, or if the resource is DADX, the XSD is generated for the message types used by the resource's WSDL interface. Regardless, after the XSD is generated, the logic proceeds to block 52 where the response is returned to the service requester. The logic then ends at state 54.

At decision diamond 60, if the action is not XSD, the logic proceeds to decision diamond 64 where it is determined whether the action is TEST. If so, at block 66, an HTML documentation and test page response are generated. Thereafter, at block 52, this response is returned to the service requester. The logic then ends at state 54.

Returning to decision diamond 64, if the action is not TEST, the logic continues to decision diamond 68 where it is determined whether the action is one of: WSDL, WSDLservice, or WSDLbinding. If so, the logic moves to block 70 where a WSDL response is generated that includes the appropriate content. For example, if the action is WSDL, a self-contained WSDL document is generated. Or, if, e.g., the action is WSDLservice, only the WSDL service elements are generated. Furthermore, if, e.g., the action is WSDLbinding, the WSDL binding elements and any elements that they reference are generated. It can be appreciated that the WSDLservice and WSDLbinding actions are useful for working with Universal Description, Discovery and Integration (UDDI) registries. After the WSDL response is generated, the logic moves to block 52, where the response is returned to the service requestor. The logic then ends at state 54. If, at decision diamond 68, the action is not WSDL, the request is invalid and an error response is returned to the requester. Then, the logic ends at state 54.

Referring now to FIG. 3 a non-limiting, exemplary DADX file related to a parts database is shown. This particular DADX file implements three operations: "findAll" 70, "findByColor" 72, and "findByMinPrice" 74. All three operations are implemented using the stored procedure DXXGenXML, which works with the XML collection method. It is to be appreciated that each operation may use a different implementation and access method. As shown in FIG. 3, the DADX file refers to the same DAD, "getstart_xcollection.dad" 76, for each operation. Moreover, each operation specifies an SQL override 78, 80, 82 which replaces the parameterized SQL statement 84, 86, 88 defined in the DAD file. Although the SQL statement is overridden, the new SQL statement produces a data set that is compatible with the SQL mapping defined in the DAD file. For example, the column names that appear in the DAD file must also appear in the SQL override.

FIG. 3 also shows that the WHERE clauses of the SQL statements within each operation are modified to include search conditions. For example, within the "findByColor" operation 72, the WHERE clause has been modified as follows: "where p.order_key=o.order_key and s.part_key=p.part_key and color=:color." Within the "findByMinPrice" operation, the WHERE clause has been modified to include "p.price>=:minprice." The DxxInvoker extracts the parameters from the request, parses and validates them, converts them to SQL syntax and substitutes them for the host variables in the SQL override.

FIG. 4 on the other hand shows the general schema for any DADX file. FIG. 4 shows a complete set of operations supported by DADX. It is to be understood that the XML collection operations use DXX stored procedures. Moreover, it is to be understood that the SQL operations use normal SQL SELECT, UPDATE, INSERT, DELETE, and CALL statements, and can be used for XML column operations by employing the DXX UDTs and UDFs. When using the SQL operations, parameters can be defined using XSD elements as well as simple types. For the query operation, XSD elements can be associated with column values in the result set. For CALL operations, the parameters can be declared as IN, OUT, or IN/OUT.

The XML collection operations include retrieve XML and store XML. FIG. 4 shows the definitions of these operations. The other SQL operations include query, update, and call. The definitions and specifications that refer to these operations include: <element ref="dadx:query"/> 104, <element ref="dadx:update"/> 106, and <element ref="dadx:call"/> 108. These statements have the format: <element ref="dadx:parameter" minOccurs="0" maxOccurs="unbounded"/> 110. Specifically, these statements can occur after the "SQL_override" statement 112, after the "SQL_query" statement 114, after the "SQL_update" statement 116, and after the "SQL_call" statement 118. During operation, the parameter values are provided by the client. If necessary, the results corresponding to the search term can be processed at the router by the DXX Invoker 18 so that they can be transmitted through the firewall back to the client.

While the particular SYSTEM, METHOD, AND COMPUTER PROGRAM PRODUCT FOR REFORMATTING NON-XML DATA FOR USE WITH INTERNET BASED SYSTEMS as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A method for permitting a client to access a database system on a server via an Internet connection, comprising:
   providing middleware communicating with the client and server;
   the middleware including at least one file;
   the file having at least one parameterized database system query language (SQL) statement;
   in response to a client request for data including values and specific methods but not an SQL query, accessing the file; and
   using the parameterized statement to return data satisfying the request to the client.

2. The method of claim 1, wherein the data satisfying the request is sent via Hypertext Transfer Protocol (HTTP) in Extensible Markup Language (XML).

3. The method of claim 1, wherein the parameterized statement facilitates a query for data.

4. The method of claim 1, wherein the parameterized statement facilitates an update to the database system.

5. The method of claim 1, wherein the parameterized statement facilitates an SQL stored procedure call.

6. The method of claim 1, wherein the client request is one of the following: a SOAP request, an HTTP GET request, or an HTTP POST request.

7. The method of claim 1, wherein the middleware further comprises:
   at least one router receiving the client request; and
   the router including at least one servlet.

8. The method of claim 7, wherein the servlet replaces at least some parameters in the parameterized statement with corresponding values from the client request to establish a fully qualified SQL statement.

9. The method of claim 8, wherein the servlet sends the SQL statement to the database system for execution thereof.

10. The method of claim 9, wherein the database system generates a response to the SQL statement and the method further comprises:
    sending the response to the client.

11. The method of claim 10, further comprising the act of:
    converting the response to XML.

12. The method of claim 7, wherein the servlet generates documentation and a test page in HTML at least partially based on the client request.

13. The method of claim 7, wherein the servlet generates a service description (WSDL file) at least partially based on the client request.

14. The method of claim 7, wherein the servlet incorporates a document access definition (DAD) at least partially based on the client request.

15. The method of claim 7, wherein the servlet generates Extensible Markup Language Schema data (XSD) at least partially based on the client request.

16. A computer system, comprising:
    at least one client transmitting a client request including values but not a fully qualified SQL statement;
    at least one middleware accessible to the client;
    at least one file accessible to the middleware and containing at least one parameterized statement; and
    at least one database system accessible to the middleware, wherein the middleware replaces at least some parameters in the parameterized statement corresponding values from the client to establish a fully qualified SQL statement for execution thereof by the database system.

17. The system of claim 16, wherein:
    the middleware sends the SQL statement to the database system for execution thereof.

18. The system of claim 17, wherein:
    the database system generates a response to the SQL statement and the response is returned to the client.

19. The system of claim 16, wherein the client request is one of the following: a SOAP request, an HTTP GET request, or an HTTP POST request.

20. The system of claim 16, wherein:
    the middleware generates documentation and a test page in HTML at least partially based on the client request.

21. The system of claim 16, wherein:
    the middleware generates a service description (WSDL file) at least partially based on the client request.

22. The system of claim 16, wherein:
    the middleware servlet incorporates a document access definition (DAD) at least partially based on the client request.

23. The system of claim 16, wherein:
    the middleware generates Extensible Markup Language Schema data (XSD) at least partially based on the client request.

24. A method for permitting a client to access a database system on a server via a wide area network, comprising:
    providing a file between the client and database system, the file having at least one parameterized SQL statement;
    replacing at least some parameters in the parameterized statement with corresponding values from the client request to establish a fully qualified SQL statement;
    sending the SQL statement to the database system for execution thereof;
    at the database system, generating a response to the SQL statement;
    converting the response to XML if necessary; and
    sending the response to the client.

25. A computer program device, comprising:
    a computer readable means having logic means for facilitating data communication between a client and a database at a server, comprising:
    logic means for receiving at least one client request for data from the client, the client request including desired values but not constituting a fully qualified SQL statement;
    logic means for accessing a file having at least one parameterized SQL statement at least partially based on the client request;
    means for replacing at least one parameter in the parameterized SQL statement with at least one value from the client to establish a fully qualified SQL statement; and
    logic means for returning a response to the client at least partially based on the parameterized SQL statement.

26. The computer program device of claim 25, wherein the client request is one of the following: a SOAP request, an HTTP GET request, or an HTTP POST request.

27. The computer program device of claim 26, wherein the computer readable means further comprises:
    logic means for generating documentation or a test page in HTML at least partially based on the client request.

28. The computer program device of claim 26, wherein the computer readable means further comprises:
    logic means for generating a service description (WSDL file) at least partially based on the parameterized SQL statement.

29. The computer program device of claim 26, wherein the computer readable means further comprises:
    logic means for incorporating a DAD file at least partially based on the client request.

* * * * *